Jan. 29, 1957     C. H. HOEPPNER     2,779,540

MACHINE CONTROL RECORD

Filed Aug. 31, 1953

INVENTOR
CONRAD H. HOEPPNER
BY *[signature]*
ATTORNEY

United States Patent Office

2,779,540
Patented Jan. 29, 1957

2,779,540

MACHINE CONTROL RECORD

Conrad H. Hoeppner, Plandome, N. Y., assignor, by mesne assignments, to Datamatic Corporation, a corporation of Delaware Application August 31, 1953, Serial No. 377,546

1 Claim. (Cl. 235—61.12)

The present invention relates to the art of controlling machine operations with a record carrying control marks, for example, an accounting card used in business machines, and more particularly relates to a system utilizing a record to which magnetic marks are applied.

One application of such a system is in the field of department store accounting, wherein it is desired to compute at high speeds periodic sales, changes in inventory, and the like. One generally known system for this purpose involves a merchandise tag having one or more separable portions on each of which duplicate information such as price, is coded by spaced marks of magnetic ink. Ink marks are preferable to punched marks for the reason that the latter are subject to mutilation when handled by a customer so that the coded information may be rendered incorrect. Ink spots, on the other hand, do not shift in position or size and cannot be confused with accidental perforations or tears in the tag.

After being prepared with coded magnetic marks representing various items of information the tag is attached to the merchandise. One portion of the tag is separated at the time of sale of the merchandise, and the remaining portion or portions are left attached to the merchandise. The detached portion is used along with similar detached portions to total the sales for the day or week, or to record the depletion of stock inventory. Should the merchandise be subsequently returned for credit, the remaining portion of the tag may be used to reduce the day's net total sales, or to indicate an increase in stock.

The computing of sales and inventory changes may be performed rapidly by accounting machines capable of analyzing the coded magnetic marks on the tag portions, however, hitherto clerical supervision has been required to differentiate between a tag portion representing a sale, and a portion representing a return. That is, human judgment has been used to recognize visual markings on a tag portion and to determine whether the information on the portion is to be added to or subtracted from a total. Where daily sales involves thousands of items the efficiency of the accounting system may be seriously hampered and its accuracy reduced by human error.

One object of the present invention is to provide a tag portion which may be differentiated from other tags without resorting to visual selection. A further object is to mark a tag with a distinctive characteristic which does not involve the applying additional control marks on the tag, which characteristic may be conveniently transferred to another record.

Other objects of the invention are to provide a simple and inexpensive system for marking and utilizing a machine control record.

In a broad aspect the invention involves a machine control record comprising a support such as a paper card, and a plurality of spaced magnetic control marks on the support, at least one of the marks having a recurrently varying magnetic density along one of its dimensions, that is, the magnetic particles in the mark are arranged so that the magnetic flux density along one dimension of the mark varies, preferably at regular, distinctive intervals, or in a cyclic manner. Such a record is capable of both selecting one of several available machine operations and then controlling the selected operation, the distinctive magnetic density variations performing the selection and the spaced relationship of the marks performing the control function.

In another aspect the invention involves a method of selecting and controlling one of a plurality of machine operations which comprises recording the aforesaid spaced magnetic control marks on a portion of a record, and feeding the record through a varying magnetic field, for example an oscillatory field, thereby to impress a recurrently varying magnetic density along one dimension of the marks of said portion. More specifically, the method involves the further steps of utilizing the varying density characteristic of the marks for the selection of one of the aforesaid operations, and utilizing the spacing of the marks to control the selected operation.

In a further aspect the method comprises the step feeding the record prepared as above together with another record through a magnetic field oscillating at a different frequency than the aforesaid distinctive frequency used to vary the density of the marks, thereby to transfer the cyclic density variations of the marks to the other record, and subsequently selectively detecting the transferred variations of the marks which are characterized by the distinctive frequency.

For the purpose of illustration a typical embodiment of the invention is disclosed in the accompanying drawing, wherein.

Figure 1:
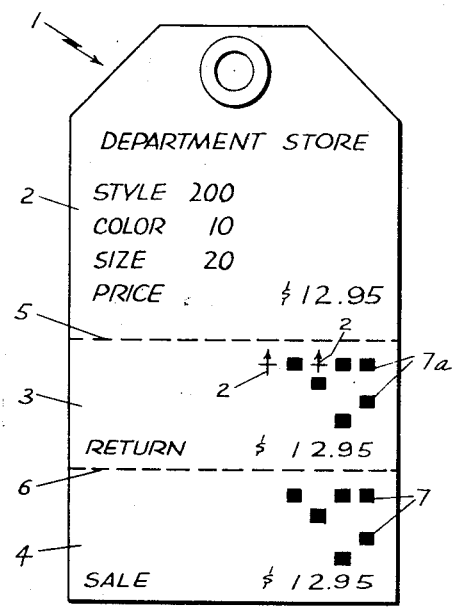
Fig. 1 is a plan view of a merchandise tag prepared according to the present invention.

A typical merchandise tag 1 shown in Fig. 1 includes a permanent portion 2 and separable return and sale portions 3 and 4 respectively. Weakened tear lines 5 and 6 permit separation of the return and sale portions. On the permanent portion are printed the sales and stock control information such as style, color, size and price. Any or all of these items of information may be encoded on the return and sale portion by means of magnetic ink marks 7. Such inks which are known in the art comprise a fluid or plastic carrier for magnetic particles such as iron. For example, in Fig. 1 the price is coded in duplicate by magnetic marks 7a and 7 on the return and sale portions 3 and 4 respectively. These marks are arranged in a conventional binary code spacing, each vertical group of marks representing the digit printed immediately below. In practice it is desirable to encode the other items, style, color and size on the detachable portions 3 and 4, however; for simplicity I have shown only coded price information.

Figure 2:
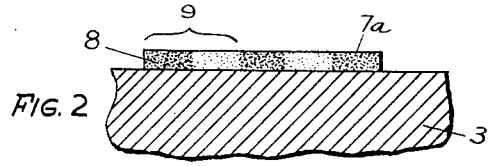
Fig. 2 is a section on line 2—2 of Fig. 1.

According to the present invention one of the separable portions, for example the return portion 3 is passed through an oscillating magnetic field so as to vary the flux density along one dimension of each of the marks. Thereby marks 7a will be produced with magnetic density variations 8 occurring at intervals 9 along the dimension of the mark 7a in the direction in which the portion 3 is fed through the oscillating field, as shown in Figs. 2 and 3.

One conventional device for producing such density variations includes a magnetic recording head 11 driven by an oscillator 12. The interval 9 of the magnetic variations 8 will depend on the speed with which the portion is fed through the field and the frequency of the field.

Figure 3:
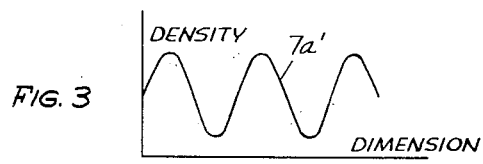
Figs. 3 and 4 represent magnetic density variations.

A suitable frequency is three kilocycles in the audio spectrum, the characteristic of the field being preferably sinusoidal as indicated in Fig. 3 with respect to the corresponding magnetic density variation characteristic 7a'.

A tag so prepared includes a return and a sale portion which are duplicate in so far as the coded information is concerned but which may be distinguished by distinctive density variation of the marks on one of them. The card portions may be used directly to control two different machine operations. For example the sale portion when fed through an accounting machine may cause price to be added to a total through analysis of the coded marks 7 in a well-known manner. On the other hand the return portion 3 whose marks carry the cyclic magnetic variation may be used to select a subtractive operation. Thus, at the time a sale of merchandise is made the sale portion will be fed to the accounting machine and the sales price added to the daily sales total. However, if the merchandise is returned, the return portion will be fed in the accounting machine and the density variations will cause the machine to substract the price of the returned article from the daily total.

Figure 4:
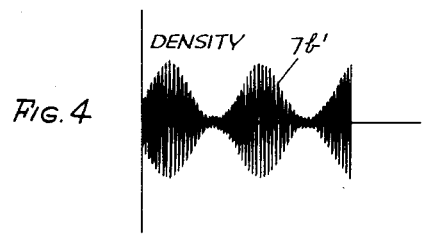
Figure 5:
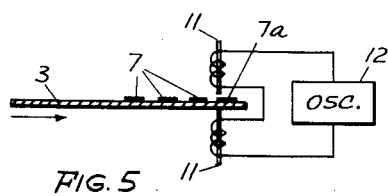
Figs. 5 and 6 are schematic diagrams illustrating the present novel method.
Figure 6:
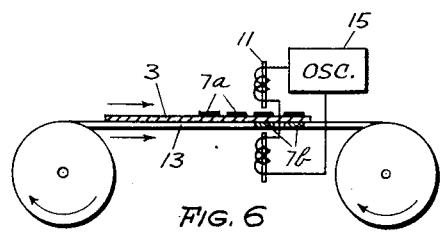

It has been found desirable to make a permanent record of transactions such as sales or returns for subsequent accounting procedures, and according to the present invention a method is provided for transferring the control information represented by the spacing of the marks 7a and in addition the selection of the operation as represented by the magnetic variation on the marks. As shown diagrammatically in Fig. 6 the return portion 3 is fed through a magnetic field along with a magnetic recording tape 13. The transfer field may be provided by the conventional recording head 11 and an oscillator 15 having a different frequency than the oscillator 12. Preferably the transfer oscillating field is much higher, for example 30 kilocycles, than the previously used field, for producing variations in the marks 7a. However, a wide range of frequencies is available for use in the original or transfer fields, and in fact a steady or zero frequency magnetic transfer field may be used. If a high frequency field is used it will cause a transfer of the marks 7a to the permanent record tape 13 in the form of transfer marks 7b whose density variations are illustrated graphically at 7b' in Fig. 4.

Figure 7:
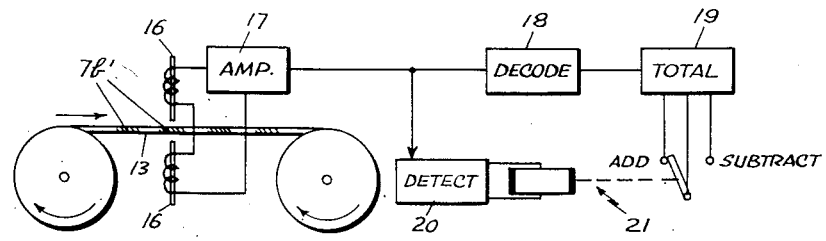

Either the original separable portions 3 and 4, or the permanent record 13 may be analyzed and totaled by a method illustrated diagrammatically in Fig. 7. As shown in Fig. 7 the tape 13 with the transfer marks 7b' is fed through a magnetic pick-up 16 so as to produce an electric signal corresponding to the density variation 7b' of Fig. 4. These variations are in the nature of a carrier alternating at the transfer frequency on which is imposed a modulation at the original distinctive frequency impressed on the marks 7a. The electrical signal produced will be in the nature of a pulse having several cycles sufficient to identify the original distinctive frequency. The pulses per se are amplified by an amplifier 17 and decoded by a decoder 18 in a conventional manner and may be used to control a totaling operation of an accounting machine. According to the illustrated embodiment, if the portion of the tape being analyzed carries marks transferred from a sales portion, the distinctive modulation frequency will not be present in the pulse corresponding to each mark and after decoding the signal may be utilized for an adding operation. In the case of a return portion, the distinctive modulation frequency impressed as a magnetic density variation on the marks 7a of the return card may be selected by a detecting step 20 and used to control a switching operation 21 which in turn selects a different totaling operation such as subtraction in the totalizer 19. By virtue of the detecting step the totaling operation will be effected only when a return portion 3 or the corresponding marks 7b transferred to a tape 13 are being analyzed.

While I have shown that the return portion may carry marks with density variations it will be obvious to those skilled in the art that the sale portion or other portions may carry marks with density variations at different distinctive intervals so that one of several machine operations may be selected for control according to the spacing of the marks. It should further be understood that these operations are not limited to the totaling of sales but may be used to compile other summaries such as the total number of articles sold as reduced by those returned, changes in inventory, the dollar value or number of units of merchandise received from the manufacturer as reduced by those returned to him and many other compilations involving two or more control machine operations such as addition, subtraction, multiplication and classification. Classification may be made according to the sales department, the manufacturer, the date of purchase as well as price, style and color. Thus it will be understood that the present invention is for the purpose of illustration only and includes all the modifications and equivalents which fall within the appended claim.

What is claimed is:

A dual information storage record comprising a single layer non-magnetic planar support, a plurality of discrete and spaced visible marks deposited on an exposed surface of said support at the time of the transfer of information to said record and formed of a magnetic material wherein the relative physical position of said marks is indicative of information stored on said record, at least one of said marks comprising a magnetic material having a predetermined frequency signal recorded thereon along a selected dimension thereof to store additional information other than that stored by the relative position of said marks on said support.

References Cited in the file of this patent

UNITED STATES PATENTS

| | | |
|---|---|---|
| 1,760,417 | Lake | May 27, 1930 |
| 2,010,642 | Peirce | Aug. 6, 1935 |
| 2,247,905 | Bryce | July 1, 1941 |
| 2,254,931 | Bryce | Sept. 2, 1941 |
| 2,427,383 | Bryce | Sept. 16, 1947 |